Patented Feb. 2, 1932

1,843,808

UNITED STATES PATENT OFFICE

CHARLES WILLIAM DOWSETT, OF BWANA M'KUBWA, NORTHERN RHODESIA, ASSIGNOR TO ANGLO AMERICAN CORPORATION OF SOUTH AFRICA, LIMITED, OF JOHANNESBURG, TRANSVAAL, UNION OF SOUTH AFRICA

SOLVENT TREATMENT OF COPPER SILICATE ORES

No Drawing. Application filed July 20, 1928, Serial No. 294,327, and in Union of South Africa December 7, 1927.

The present invention relates to the extraction of copper by solvent methods from ores and materials in which it occurs as copper silicate.

Some copper silicate ores cannot be economically treated with acid solvent on account of their large content of unprofitable acid-consuming constituents. An alternative procedure is to use an ammoniacal solvent; but heretofore it has not been possible to treat copper silicate ores directly with such solvent, as is done with copper oxide and carbonate ores, on account of the low solubility of the silicate in the ammonia solvent. It has accordingly been the practice to subject copper silicate ores to a preliminary heating and chemical reducing treatment in order to render the copper constituent amendable to ammonia solvent. The cost of such preliminary treatment is however, such as to render the treatment of many copper silicate deposits economically upracticable.

It has now been discovered that by bringing copper silicate material to a suitably fine state of division, it is rendered soluble in an ammoniacal solvent and particularly a solution of ammonium carbonate to such an extent as to make its direct treatment by such solvent economically practicable in many cases.

The invention accordingly consists in mechanically reducing raw ore or material containing copper in the form of silicate to a fine state of division, of the order of 200 mesh or finer, and treating it directly with an ammonia solvent such as a solution of ammonium carbonate and thereby extracting the copper.

In practically carrying out the invention in the preferred manner the ore is ground with water to produce a slime pulp containing say ninety per cent of minus 200 size. The pulp is filtered in a pressure filter and additionally de-watered by forcing air through the filter cake to reduce the moisture content to less than about twenty per cent.

While the cake remains in the filter the ammoniacal solvent is forced through it. This has the advantage of effecting the dissolution of the copper under pressure, which usually results in increased extraction. It also keeps the solvent solution enclosed and so prevents loss of ammonia. When the dissolution of the copper is completed, a wash is passed through the cake, which is then treated with steam for recovery of residual ammonia. The impoverished cake is discharged and the copper is recovered from the enriched ammoniacal solution by suitable means such as heating the solution.

I claim:

1. The process of extracting copper from ores and materials in which it occurs in the form of silicate, consisting in grinding the ore or material so that about 90 per cent of it will pass a 200 mesh screen, and treating the ground product with an ammoniacal solvent directly and without a previous roasting operation.

2. The process of rendering copper silicate ore soluble in ammoniacal solvent without roasting operation, which consists in first grinding the ore with water to produce a slime pulp containing about 90% of minus 200 size granules; second, filtering and dewatering said pulp to obtain a cake by forcing air therethrough in order to reduce the moisture content to less than 20%; third, forcing ammoniacal solvent through the cake in order to effect dissolution of the copper under pressure; fourth, washing the cake after complete dissolution of the copper; fifth, treating the cake with steam thereby recovering residual ammonia; and finally heating the enriched ammoniacal solution in order to recover the copper while the impoverished cake is discharged.

In testimony whereof I affix my signature.

C. W. DOWSETT.